US012385867B2

(12) United States Patent
Maligin et al.

(10) Patent No.: US 12,385,867 B2
(45) Date of Patent: Aug. 12, 2025

(54) HUMIDITY DETECTION FOR HEARING DEVICES

(71) Applicant: Starkey Laboratories, Inc., Eden Prairie, MN (US)

(72) Inventors: Vladimir Maligin, Tel Aviv (IL); Nitzan Bornstein, Tel Aviv (IL)

(73) Assignee: Starkey Laboratories, Inc., Eden Prairie, MN (US)

( * ) Notice: Subject to any disclaimer, the term of this patent is extended or adjusted under 35 U.S.C. 154(b) by 247 days.

(21) Appl. No.: 18/156,503

(22) Filed: Jan. 19, 2023

(65) Prior Publication Data

US 2023/0251222 A1    Aug. 10, 2023

Related U.S. Application Data

(60) Provisional application No. 63/267,695, filed on Feb. 8, 2022.

(51) Int. Cl.
| | |
|---|---|
| *G01N 27/22* | (2006.01) |
| *G08B 3/10* | (2006.01) |
| *G08B 21/18* | (2006.01) |

(52) U.S. Cl.
CPC ............. *G01N 27/223* (2013.01); *G08B 3/10* (2013.01); *G08B 21/182* (2013.01)

(58) Field of Classification Search
CPC ....... G01N 27/223; G08B 3/10; G08B 21/182
USPC ......................................................... 340/602
See application file for complete search history.

(56) References Cited

U.S. PATENT DOCUMENTS

| | | | |
|---|---|---|---|
| 7,030,630 B2 | 4/2006 | Haas et al. | |
| 7,387,024 B2 | 6/2008 | Itakura et al. | |
| 11,935,575 B1* | 3/2024 | Sarwar | G06N 3/084 |
| 2004/0244215 A1 | 12/2004 | Greenspan et al. | |
| 2009/0287063 A1* | 11/2009 | Freedman | A61B 5/0531 |
| | | | 600/300 |

(Continued)

FOREIGN PATENT DOCUMENTS

| | | |
|---|---|---|
| DE | 102017215115 | 2/2019 |
| EP | 2849463 | 3/2015 |

OTHER PUBLICATIONS

"Humidity and Temperature Sensor Node for Sub-1GHz Star Networks Enabling 10+ Year Coin Cell Battery Life", TI Designs: TIDA-00484 Texas Instruments Incorporated, [Online]. Retrieved from the Internet: URL: https: www.ti.comlit pdf tidu995e, (2018), 36 pgs.

(Continued)

*Primary Examiner* — Jack K Wang
(74) *Attorney, Agent, or Firm* — Schwegman Lundberg & Woessner, P.A.

(57) ABSTRACT

Disclosed herein, among other things, are systems and methods for humidity detection for hearing device applications. A method includes calculating a capacitance between a terminal of a processor within a housing of an ear-wearable device and a designated ground plane within the housing. A temperature measurement is obtained from a sensor within the housing, and a humidity level is determined within the housing using the calculated capacitance and the obtained temperature measurement. The determined humidity level is compared to one or more predetermined humidity trigger levels, and a notification is sent to a wearer of the ear-wearable device conditioned on the comparison.

20 Claims, 8 Drawing Sheets

(56) References Cited

U.S. PATENT DOCUMENTS

| | | | | |
|---|---|---|---|---|
| 2014/0113828 A1* | 4/2014 | Gilbert | .................... | G01L 21/12 |
| | | | | 252/500 |
| 2019/0326501 A1* | 10/2019 | Gilbert | .................... | C04B 35/45 |
| 2021/0389587 A1* | 12/2021 | Tsuruga | ............... | G02B 27/017 |
| 2022/0087551 A1* | 3/2022 | Montgomery, II | ..... | G06F 1/169 |
| 2022/0140657 A1* | 5/2022 | Guedon | ............. | H02M 1/0025 |
| | | | | 307/149 |
| 2022/0397614 A1* | 12/2022 | Yano | .................... | G01R 15/165 |
| 2023/0231211 A1* | 7/2023 | Bertken | ................ | F21V 23/023 |
| | | | | 320/114 |
| 2023/0251222 A1* | 8/2023 | Maligin | ............... | G01N 27/223 |
| | | | | 340/602 |

OTHER PUBLICATIONS

"PSoC 4™ and PSoC™ 6 MCU CAPSENSE™ design guide", AN85951. Infineon Technologies AG, [Online]. Retrieved from the Internet: URL: https: www.cypress.com file 46081 download, (Mar. 20, 2024), 256 pgs.

"BME280 Datasheet", Bosch Sensortec GmbH, [Online]. Retrieved from the Internet: URL: https: itbrainpower.net downloadables BST-BME280-DS002-1509607.pdf, (Sep. 2018), 56 pgs.

"Bosch MEMS Technology", Bosch Sensortec GmbH, [Online]. Retrieved from the Internet: URL: https: www.bosch-sensortec.com , (Accessed Oct. 7, 2024), 8 pgs.

"Embedded world 2021: a digital nose gas sensor with AI", Embedded, [Online]. Retrieved from the Internet: URL: https: www.embedded.com embedded-world-2021-a-digital-nose-gas-sensor-with-ai , (Mar. 1, 2021), 8 pgs.

"The Capacitve Humidity Sensor", Rotronic AG, [Online]. Retrieved from the Internet: URL: https: www.rotronic.comen humidity_measurement-feuchtemessung-mesure_de_I_humidite capacitive-sensors-technical-notes-mr, (Accessed Oct. 7, 2024), 1 pg.

"The Capacitive Humidity Sensor - How it Works and Attributes of the Uncertainty Budget", Rotronic Technical Note, [Online]. Retrieved from the Internet: URL: https: www.rotronic.com pub media productattachments files c acapacitive_humidity_sensor_final.pdf, (Accessed Oct. 7, 2024), 3 pgs.

\* cited by examiner

HUMIDITY DETECTION FOR HEARING DEVICES

CROSS-REFERENCE TO RELATED APPLICATION

This patent application claims the benefit of U.S. Provisional Patent Application No. 63/267,695, filed Feb. 8, 2022, which is incorporated by reference herein in its entirety.

TECHNICAL FIELD

This document relates generally to hearing device systems and more particularly to humidity detection for hearing device applications.

BACKGROUND

Examples of hearing devices, also referred to herein as hearing assistance devices or hearing instruments, include both prescriptive devices and non-prescriptive devices. Specific examples of hearing devices include, but are not limited to, ear-wearable devices such as hearing aids, headphones, assisted listening devices, and earbuds.

Hearing aids are used to assist patients suffering hearing loss by transmitting amplified sounds to ear canals. In one example, a hearing aid is worn in and/or around a patient's ear. Hearing aids may include processors and electronics that improve the listening experience for a specific wearer or in a specific acoustic environment.

The processors and electronics within a hearing device are sensitive to humidity level within a device housing, and device performance and longevity can be negatively impacted if the humidity level is excessive. Environmental factors such as ambient conditions and user perspiration can contribute to increased humidity levels in a hearing device. Improved methods of humidity detection for hearing devices are needed.

SUMMARY

Disclosed herein, among other things, are systems and methods for humidity detection for hearing device applications. A method includes calculating a capacitance between a terminal of a processor within a housing of an ear-wearable device and a designated ground plane within the housing. A temperature measurement is obtained from a sensor within the housing, and a humidity level is determined within the housing using the calculated capacitance and the obtained temperature measurement. The determined humidity level is compared to one or more predetermined humidity trigger levels, and a notification is sent to a wearer of the ear-wearable device conditioned on the comparison.

Various aspects of the present subject matter include an ear-wearable device including a housing, a microphone within the housing, and hearing electronics within the housing configured to be connected to the microphone. The hearing electronics include at least one processor and a memory including instructions that, when executed by the at least one processor, cause the at least one processor to perform operations to calculate a capacitance between a terminal of the at least one processor and a designated ground plane within the housing, obtain a temperature measurement from a sensor within the housing, determine a humidity level within the housing using the calculated capacitance and the obtained temperature measurement, compare the determined humidity level to one or more predetermined humidity trigger levels, and send a notification to a wearer of the ear-wearable device conditioned on the comparison.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIG. 4 illustrates a block diagram of an example machine upon which any one or more of the techniques discussed herein may perform.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing devices generally, including ear-wearable devices including earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

The processors and electronics within a hearing device are sensitive to humidity level within a device housing, and device performance and longevity can be negatively impacted if the humidity level is excessive. Environmental factors such as ambient conditions and user perspiration can contribute to increased humidity levels in a hearing device, which may result in deterioration of the device due to humidity in the hardware, and which may drastically reduce the lifetime of the hearing device. The present subject matter provides improved methods of humidity detection for ear-wearable devices, to assist wearers (or patients) in keeping their devices in the best condition for effective use and longer device life, by alerting the wearer when the humidity level in their device is at a prescribed level that could damage the device or prematurely deplete the battery of the device. In some embodiments, the wearer is instructed to remove and/or clean the device based on the alert.

Figure 1A:
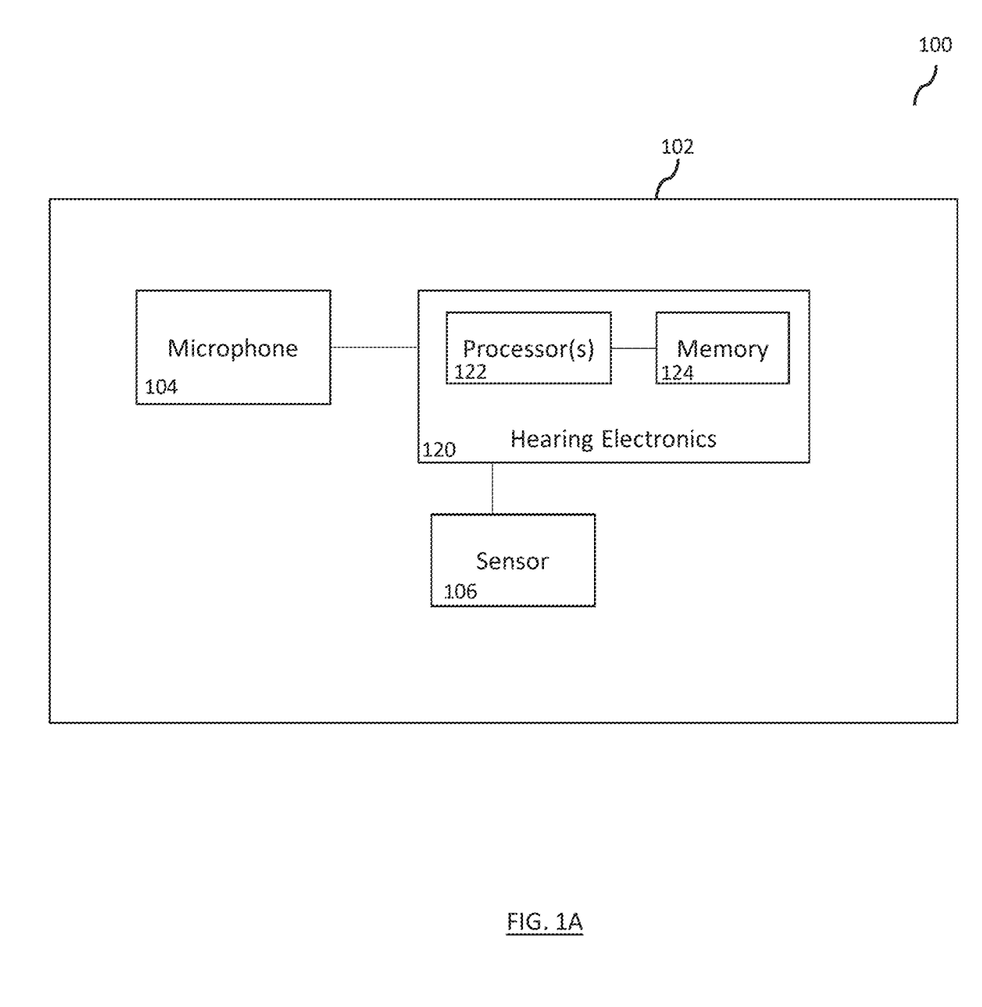
FIG. 1A illustrates a block diagram of a hearing device including humidity detection, according to various embodiments of the present subject matter.

FIG. 1A illustrates a block diagram of a hearing device including humidity detection, according to various embodiments of the present subject matter. The ear-wearable hearing device 100 including a housing 102, a microphone 104 within the housing, and hearing electronics 120 within the housing configured to be connected to the microphone 104. The hearing electronics 120 include at least one processor 122 and a memory 124 including instructions that, when executed by the at least one processor, cause the at least one processor to perform operations to calculate a capacitance between a terminal of the at least one processor 122 and a designated ground plane within the housing, obtain a temperature measurement from a sensor 106 within the housing, determine a humidity level within the housing using the calculated capacitance and the obtained temperature measurement, compare the determined humidity level to one or more predetermined humidity trigger levels, and send a notification to a wearer of the ear-wearable device conditioned on the comparison. For example, if the determined humidity level is greater than the one or more predetermined humidity trigger levels, or greater than or equal to the one or more predetermined humidity trigger levels, the notification is sent to the wearer. The one or more predetermined humidity trigger levels are stored in a memory of the device, in one example.

According to various embodiments, to calculate the capacitance, the memory further comprises instructions that cause the at least one processor to perform operations to set the terminal to an input mode, actuate a first electrical switch to connect a pull-down resistor to the terminal, and monitor the terminal to determine that a first voltage at the terminal indicates that the terminal is set to a low level indicative of a logical zero. Upon determining that the terminal is set to the low level, a second electrical switch is actuated to connect a pull-up resistor to the terminal, and a timer is initiated upon actuating the second electrical switch. The terminal is monitored to determine that a second voltage at the terminal indicates that the terminal is set to a high level indicative of a logical one. Upon determining that the terminal is set to the high level, a value is obtained from the timer, and a lookup table stored in the memory is accessed to determine the capacitance based on the obtained timer value.

Figure 1B:
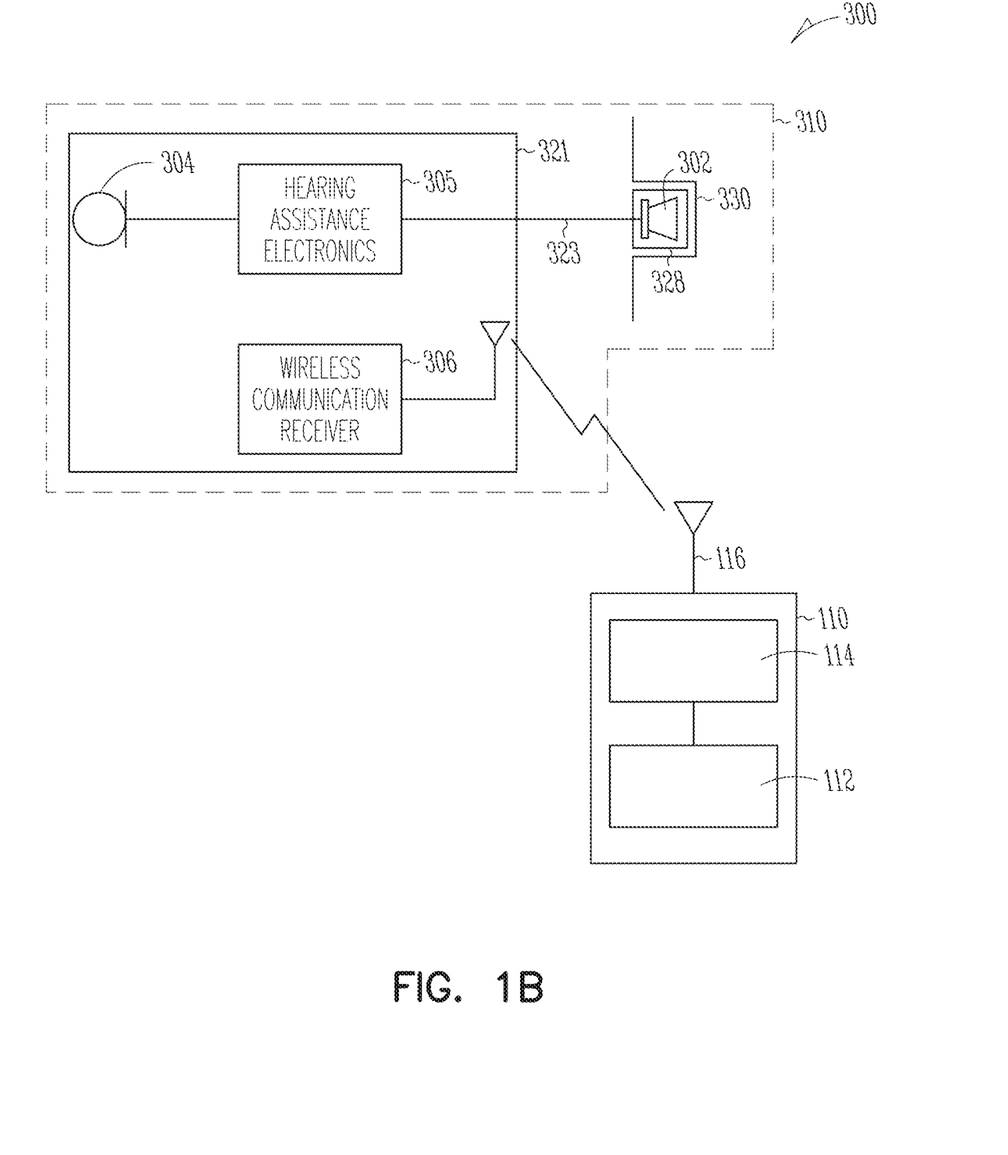
FIG. 1B illustrates a block diagram of a system for humidity detection and wireless communication for hearing devices, according to various embodiments of the present subject matter.

In various embodiments, to determine the humidity level, the memory further comprises instructions that cause the at least one processor to perform operations to access a lookup table stored in the memory to obtain the humidity level based on the calculated capacitance and the obtained temperature measurement. The lookup table is device-specific with entries dependent on mechanical characteristics of the device, in an example. In various examples, the notification to the wearer is delivered via a mobile application on a smartphone in communication with the ear-wearable device. The notification to the wearer includes a message with instructions for reducing humidity in the ear-wearable device, in an example. In various examples, the notification to the wearer is delivered via the ear-wearable device. The notification to the wearer includes an audible notification, in an example The memory includes firmware for the device, in an embodiment. In various embodiments, the ear-wearable device is a hearing aid, FIG. 1B illustrates a block diagram of a system 300 for humidity detection and wireless communication for hearing devices, according to various embodiments of the present subject matter. The system 300 shows an external device 110 in wireless communication with a hearing device 310. In various embodiments, the hearing device 310 includes a first housing 321, an acoustic receiver or speaker 302 in a second housing 328 positioned in or about the ear canal 330 of a wearer and conductors 323 coupling the speaker 302 to the first housing 321 and the electronics enclosed therein. The electronics enclosed in the first housing 321 include a microphone 304, hearing assistance electronics 305, a wireless communication receiver 306 and an antenna 307, in an embodiment. In various embodiments, the hearing assistance electronics 305 includes at least one processor and memory components. The memory components store program instructions for the at least one processor. The program instructions include functions allowing the processor and other components to process audio received by the microphone 304 and transmit processed audio signals to the speaker 302. The speaker 302 emits the processed audio signal as sound in the user's ear canal. In various embodiments, the hearing assistance electronics includes functionality to amplify, filter, limit, condition or a combination thereof, the sounds received using the microphone 304.

In the illustrated embodiment of FIG. 1B, the wireless communication receiver 306 is connected to the hearing assistance electronics 305 and the conductors 323 connect the hearing assistance electronics 305 and the speaker 302. In various embodiments, the external device 110 includes a streaming audio device such as an assistive listening device (ALD), a programmer, a smartphone, a tablet, a personal computer, or other device capable of wireless communication. The external device 110 includes an antenna 116 connected to a radio circuit 114 that include a transmitter, in an embodiment. In various embodiments, the external device 110 includes one or more processors 112 or processing components. The external device 110 may also include one or more microphones and/or one or more speakers, in various embodiments.

The present subject matter utilizes existing hardware of a hearing device to detect humidity within the hearing device, without the need for additional dedicated sensors or components. According to various embodiments, the method of humidity detection is based on measuring a capacitance between a GPIO (general purpose input/output) line of a hearing device processor and other electrical wires in the device, such as a ground plane. In various embodiments, humidity can be detected by taking a measurement of capacitance on the control GPIO line and comparing the measurement with an internal temperature in the hearing device housing which is read from an inertial measurement unit (IMU) sensor. In some examples, after determining the humidity level in the hearing device, the present subject matter is configured to notify the wearer to clean or dry their hearing device. Thus, the present subject matter can effectively and accurately track humidity and prevent deterioration of components of the hearing device.

In various embodiments, the present subject matter determines humidity based on measuring a capacitance between a GPIO wire and the ground plane. In some examples, hearing devices include dielectric materials within a housing having a typical dielectric constant ranging from 2 to 15. When no moisture is present in the hearing device, both the dielectric constant and the GPIO wire geometry (layout) determine a value of capacitance. At normal room temperature, the dielectric constant of water vapor has a value of about 80, a value much larger than the constant of the dielectric materials used in the hearing devices, Therefore, absorption of water vapor inside the hearing device results in an increase in measured capacitance. Relative humidity is also a function of both the ambient temperature and water vapor pressure. Thus, there is a relationship between relative humidity, the amount of moisture present in the hearing device, and the measured capacitance. In the hearing device housing, humidity can be determined by using a measurement of capacitance on the control GPIO wire and comparing it with an internal temperature in the hearing device housing which is read from a built-in temperature sensor, such as from an IMU sensor, according to various embodiments. In various embodiments, the capacitance measurement is based on using internal resistors which are connected between the control outlet (or GPIO line) and the ground plane (using pull-down resistor) or voltage supply Vcc (using a pull-up resistor).

According to various embodiments, a method for determining humidity in a hearing device housing is provided. In one embodiment, the method includes setting the GPIO line to an input mode, connecting a pull-down resistor to the GPIO line, and determining that the GPIO line is set to a low voltage or zero. The method embodiment further includes connecting a pull-up resistor to the GPIO line, initiating a timer, determining a logical "one" level is detected on the GPIO line, and reading the timer value which reflects a capacitance on the GPIO line. The method embodiment also includes reading an ambient temperature from a temperature sensor within the housing, and calculating a humidity level basing on the counter value and taking into account a temperature reading from the sensor.

Figure 2A:
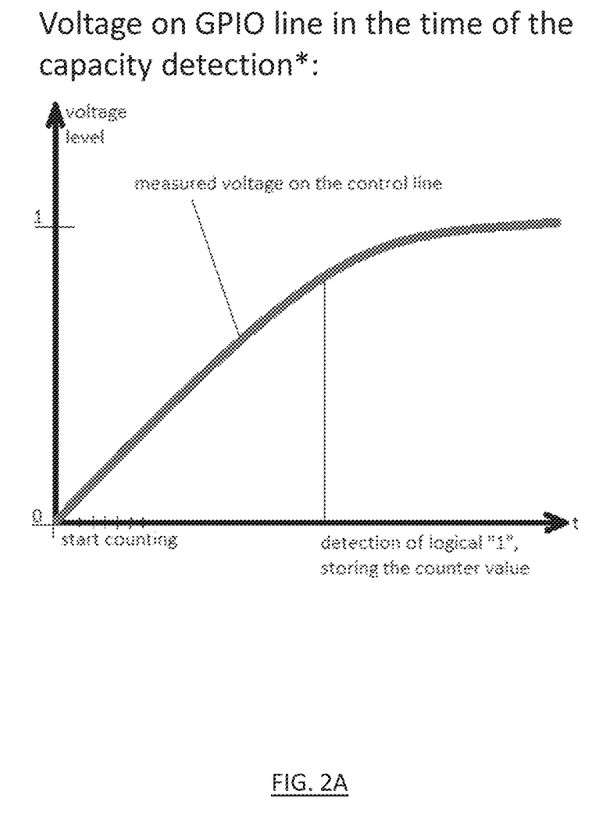
FIGS. 2A-2B illustrate graphical diagrams of voltage measurement for capacitance detection, according to various embodiments of the present subject matter.
Figure 2B:
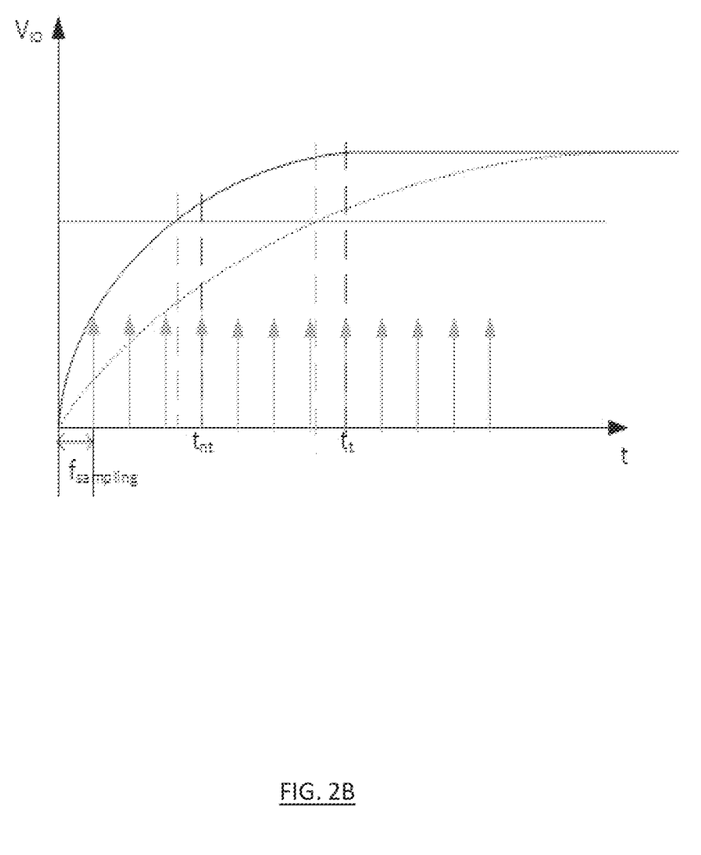
Figure 2C:
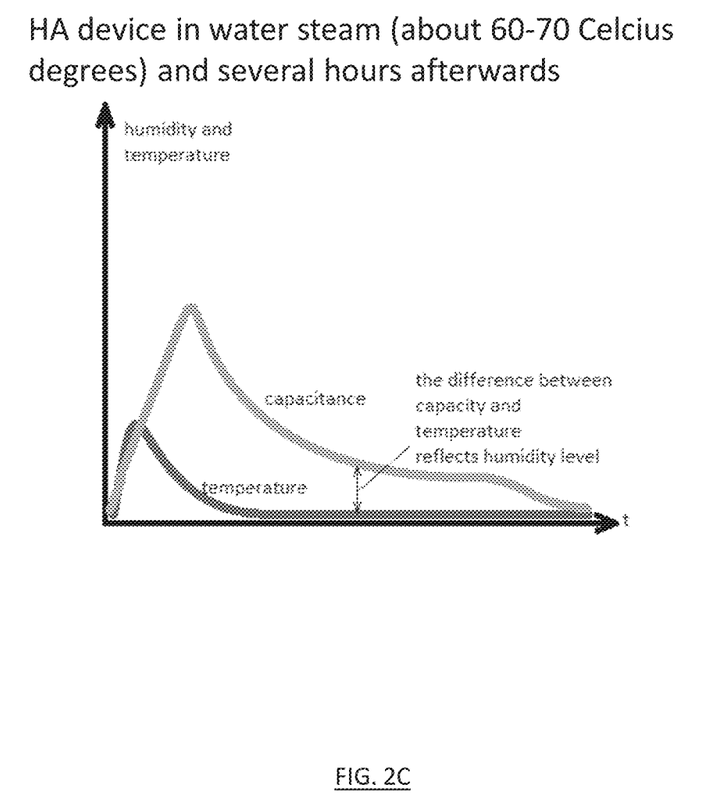
FIG. 2C illustrates a graphical diagram of capacitance and temperature for humidity detection in a hearing device, according to various embodiments of the present subject matter.

FIGS. 2A-2B illustrate graphical diagrams of voltage measurement for capacitance detection, according to various embodiments of the present subject matter. In various embodiments, the time interval between detection of logical zero and logical one reflects a value of capacitance of the control line. FIG. 2C illustrates a graphical diagram of capacitance and temperature for humidity detection in a hearing device, according to various embodiments of the present subject matter. In various embodiments, the value of capacitance is affected by both temperature and humidity. Therefore, the temperature in the housing is also determined by using a temperature sensor (such as provided in an IMU) to validate whether humidity has changed the capacitance on the control line, or wire connected to the GPM line, in various embodiments. In one embodiment, the time interval between capacitance measurements is three seconds or larger to provide a sufficient level of sensitivity. Other time intervals can be used without departing from the scope of the present subject matter. In various embodiments, the relative humidity detection is non-linear. Depending on the layout of the electronic circuits in the hearing device housing, the hearing devices may have linearity and sensitivity deviations, in various embodiments.

Previous solutions to the problem of humidity detection in hearing devices use a special or dedicated humidity sensor and control electronics, requiring requires extra space, power and increased cost. The solution of the present subject matter makes use of existing hardware within the hearing device housing to measure humidity, and does not use special sensors or additional hardware. Thus, the present subject matter saves space and cost by using existing portions of a processor or microcontroller, such as pull-up and pull down resistors, a counter, and voltage control.

In various embodiments, the present subject matter can measure humidity using any terminal or outlet of a hearing device processor, such as an SoC (System on Chip), which has an electrical contact with the air inside the hearing device. In some embodiments, each outlet can be used to determine the humidity level around its specific location within the housing. If several such outlets are be used, the humidity detection can be performed in multiple physical locations inside the hearing device, effectively including multiple geometrically spaced humidity sensors inside the device in some embodiments. In various embodiments, the outlets can also be used for other purposes during the time between the humidity determinations. Thus, the present subject matter can be used for each electrical outlet of a processor such that the hearing device can perform humidity/moisture determinations on any such line with a conductive surface exposed to air. In various embodiments, an electrical wire is connected to the outlet or terminal of the processor to make the humidity determination. The electrical wire that is used for capacitance detection can be also used as a capacitive button when this wire is routed on an external side of the hearing device housing, in an embodiment.

According to various embodiments, the present system notifies the user or wearer when the determined amount of humidity is greater than a programmable threshold that may cause harm to the device with continued operation. In various examples, the present system alerts the wearer to take action, such as requesting the wearer to clean the device or place the device in a dryer, such as a UV-C dryer using ultraviolet light in the C-spectrum, or using a desiccant or other dry environment, or using a device charger with these capabilities. In some examples, the alert may be provided on a smart phone in wireless communication with the hearing device. In some examples, the alert may be provided as an audio alert using the hearing device speaker. In other examples, the alert may be delivered through a hearing device accessory in communication with the hearing device, such as a flashing light on a hearing device charger. In some embodiments, the alerts may include a smart reminder to clean the device based on usage time or ambient conditions.

In various embodiments, the present system includes software to perform the measurement and the notification. In some embodiments, the software executes on a processor in the hearing device, such as in firmware of the processor. In other embodiments, the software may be executed partially or wholly on a device in communication with the hearing device, such as a smartphone. In some embodiments, the present humidity detection scheme can be used to detect humidity in other devices, and is not limited to hearing or ear-wearable devices.

Figure 1C:
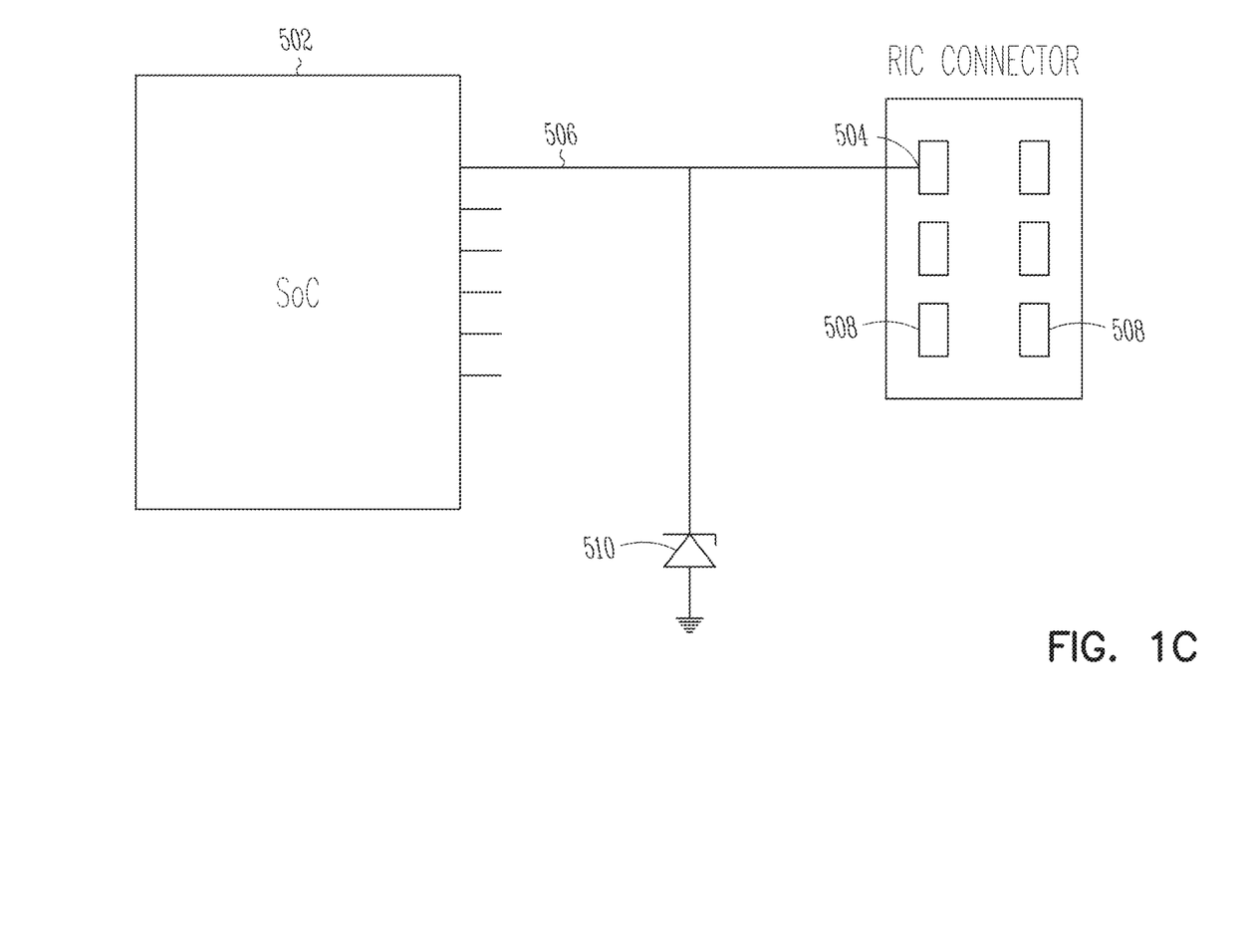
FIG. 1C illustrates a block diagram of a system for humidity detection for hearing devices, according to various embodiments of the present subject matter.
Figure 1D:
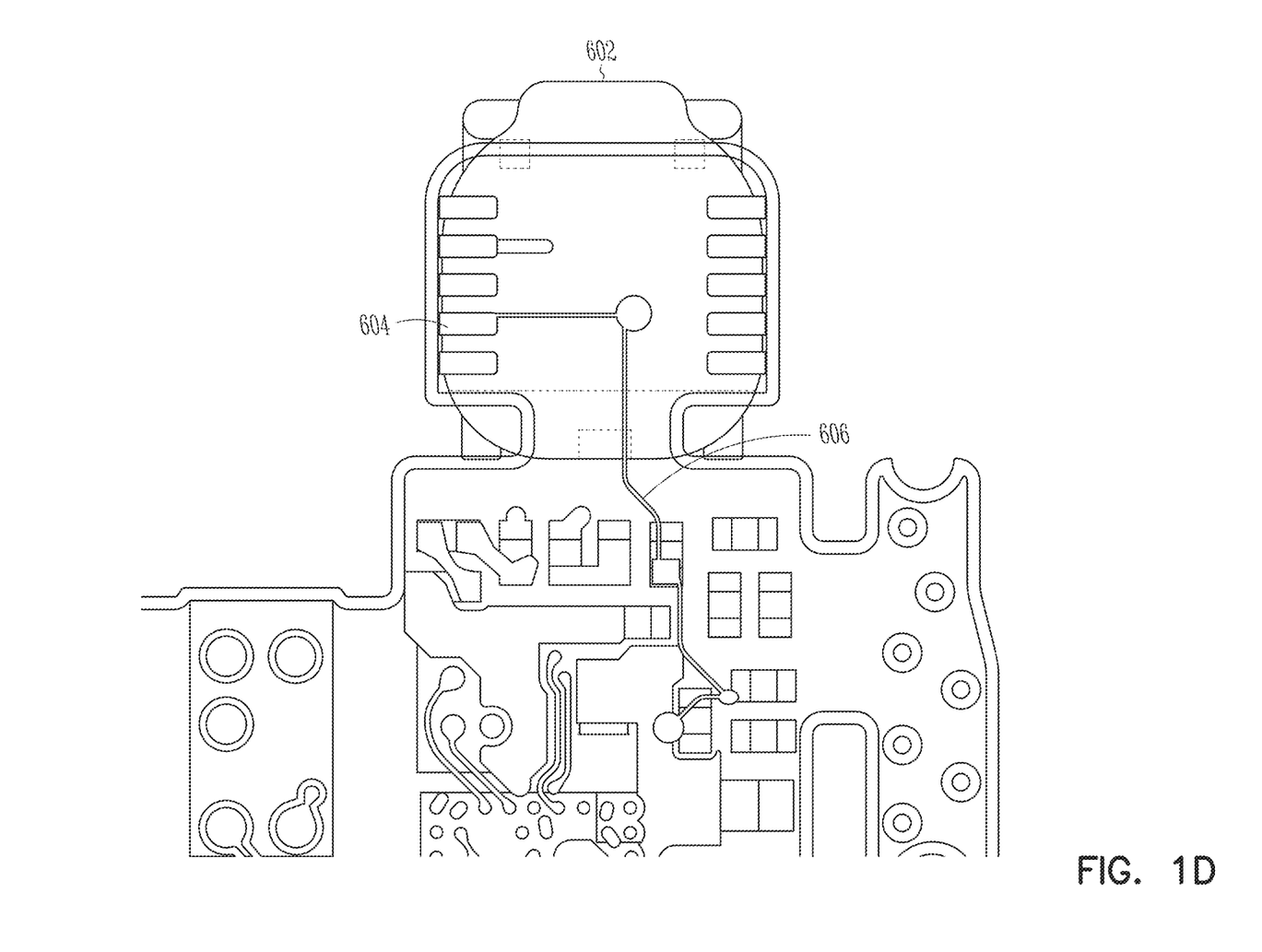
FIG. 1D illustrates a circuit diagram of a system for humidity detection for hearing devices, according to various embodiments of the present subject matter.

FIG. 1C illustrates a block diagram of a system for humidity detection for hearing devices, according to various embodiments of the present subject matter. In some examples, to determine capacitance on a control wire 506 connected to a terminal of a processor 502, the terminal is driven to a low voltage by connecting a pull-down resistor, and when a logical zero is detected on the control line, a pull-up resistor is connected to the terminal. The present system uses a timer value that reflects how rapidly the terminal goes back to a high voltage level indicative of a logical one, and using the sampling rate ($f_{sampling}$), a value of the measured capacitance is correlated with a number of samples, where $t_r$=low capacitance and $t_{nt}$=high capacitance. In various examples, the humidity is detected at a location of an opposite end of the control line at an active area 504 near contacts 508, such as in a connector location within the device housing. The control line is in contact with ambient air inside the device housing, to determine humidity along the control line in various embodiments, FIG. 1D illustrates a circuit diagram of a system for humidity detection for hearing devices, according to various embodiments of the present subject matter. In the depicted embodiment, a control line or wire 606 is connected to a processor terminal 604 in a hearing device housing 602, to determine humidity along the control line or wire 606 as described herein.

In various embodiments, the present subject matter provides for humidity detection within a hearing device without significant additional power consumption by the hearing device. In one example, the estimated power consumption was determined using a 250 KOhm resistor between the control wire and the voltage Vdd source (+1.8V, in an example) providing a maximum peak current of approximately 7.2 uA, or 8.64 uWatt. In one example, the time interval between samples is approximately 1 usec, and the time interval used between complete detections of humidity is approximately 3 seconds. In various examples, a number of samples between two and forty is used with normal ambient conditions (temperature of 25 degrees C. and a humidity of 60%), depending on a physical size and geometry of the control wire and also depending on other connections to the control line.

In various examples, when the control line is connected to other portions of the hearing device, the present subject matter uses temperature measurements to compensate for variations caused by the additional connections. In one example, an existing IMU temperature sensor provides temperature measurements used in a calculation of capacitance. In one embodiment, the control line is optionally connected to an ESD (electrostatic discharge) protection diode 510 as shown in FIG. 1C. In this embodiment, capacitance of the control line is added to a capacitance of the diode which may be affected by an ambient temperature, such that an increase in temperature increases the capacitance of the diode. In this case, the temperature sensor is used to compensate for the measured value of the capacitance. For example, if the sensed temperature is greater than 25 Celsius degrees (C.), then a "T delta" is calculated as follows: Tdelta=Tm−25, where Tm is a value of temperature that is read from IMU internal sensor. Thus, if the sensed temperature is less than or equal 25 C, Tdelta=0. In various examples, the relative capacitance (Cr) can be calculated from the measured capacitance (Cm) using the equation: Cr=Cm−(Tdelta*2).

Figure 3:
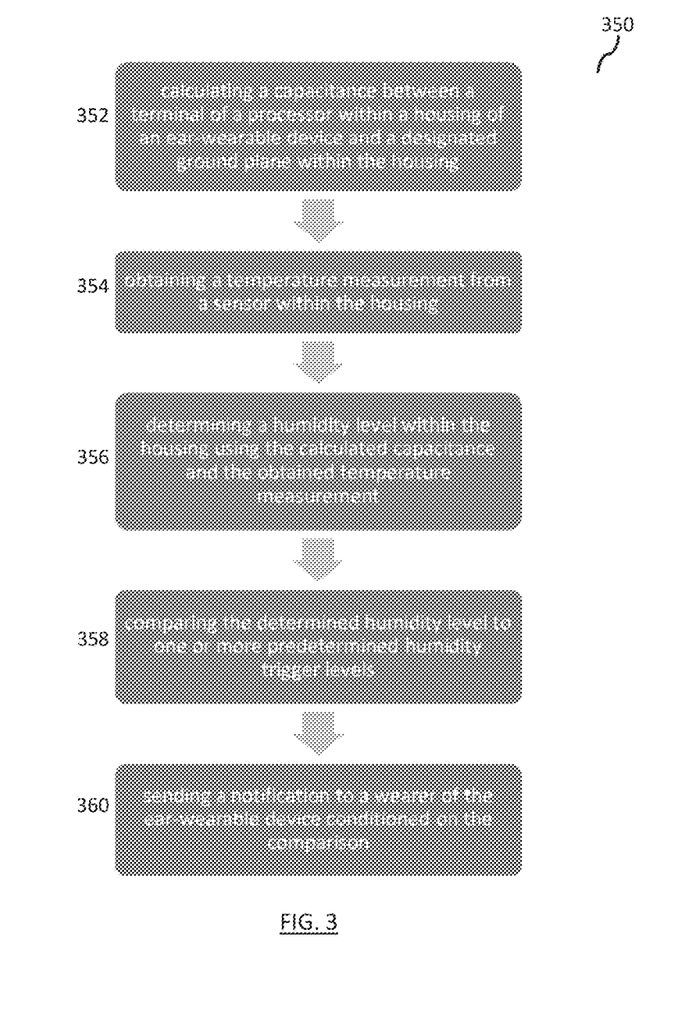
FIG. 3 illustrates a flow diagram of a method of humidity detection for hearing devices, according to various embodiments of the present subject matter.

FIG. 3 illustrates a flow diagram of a method of humidity detection for hearing devices, according to various embodiments of the present subject matter. The method 350 includes calculating a capacitance between a terminal of a processor within a housing of an ear-wearable device and a designated ground plane within the housing, at step 352. At step 354, a temperature measurement is obtained from a sensor within the housing, and a humidity level is determined within the housing using the calculated capacitance and the obtained temperature measurement, at step 356. At step 358, the determined humidity level is compared to one or more predetermined humidity trigger levels, and a notification is sent to a wearer of the ear-wearable device conditioned on the comparison, at step 360.

According to various embodiments, calculating the capacitance includes setting the terminal to an input mode, actuating a first electrical switch to connect a pull-down resistor to the terminal, and monitoring the terminal to determine that a first voltage at the terminal indicates that the terminal is set to a low level indicative of a logical zero. Upon determining that the terminal is set to the low level, a second electrical switch is actuated to connect a pull-up resistor to the terminal, and a timer is initiated upon actuating the second electrical switch. The terminal is monitored to determine that a second voltage at the terminal indicates that the terminal is set to a high level indicative of a logical one. Upon determining that the terminal is set to the high level, a value is obtained from the timer, and a lookup table is accessed to determine the capacitance based on the obtained timer value.

In various embodiments, determining the humidity level includes accessing a lookup table to obtain the humidity level based on the calculated capacitance and the obtained temperature measurement, Calculating the capacitance between the terminal of the processor and the designated ground plane includes calculating the capacitance between a general purpose input/output (GPIO) wire of the processor and the designated ground plane, in an embodiment. In various examples, calculating the capacitance between the terminal of the processor and the designated ground plane includes calculating the capacitance between the terminal of a system on chip (SoC) processor and the designated ground plane.

According to various embodiments, calculating the capacitance between multiple terminals of the processor and multiple designated ground planes to determine humidity levels at multiple locations within the housing. Obtaining the temperature measurement from the sensor within the housing includes obtaining the temperature measurement from a temperature sensor of an inertial measurement unit (IMU) within the housing, in an example. In various examples, sending the notification to the wearer of the ear-wearable device includes sending instructions to the wearer for reducing humidity within the device, Sending the notification to the wearer of the ear-wearable device includes sending an audible notification to the wearer using the ear-wearable device, in an embodiment. In various embodiments, sending the notification to the wearer of the ear-wearable device includes sending the notification to the wearer of a hearing aid.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further; while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may, include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, WEE 802.16 family of standards known as WiMax®), WEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various embodiments of the present subject matter support wireless communications with a hearing device. In various embodiments the wireless communications may include standard or nonstandard communications. Some examples of standard wireless communications include link protocols including, but not limited to, Bluetooth™, Bluetooth™ Low Energy (BLE), IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various embodiments, the battery is rechargeable. In various embodiments multiple energy sources are employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device; or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in bone conduction hearing devices, in some embodiments. The present subject matter may be used in devices whether such devices are standard or custom fit and whether they provide an open or an occlusive design. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. An ear-wearable device, comprising:
   a housing;
   a microphone within the housing; and
   hearing electronics within the housing configured to be connected to the microphone, the hearing electronics including at least one processor and a memory including instructions that, when executed by the at least one processor, cause the at least one processor to perform operations to:
   calculate a capacitance between a terminal of the at least one processor and a designated ground plane within the housing;
   obtain a temperature measurement from a sensor within the housing;
   determine a humidity level within the housing using the calculated capacitance and the obtained temperature measurement;

compare the determined humidity level to one or more predetermined humidity trigger levels; and send a notification to a wearer of the ear-wearable device conditioned on the comparison.

2. The device of claim 1, wherein, to calculate the capacitance, the memory further comprises instructions that cause the at least one processor to perform operations to:

set the terminal to an input mode;

actuate a first electrical switch to connect a pull-down resistor to the terminal;

monitor the terminal to determine that a first voltage at the terminal indicates that the terminal is set to a low level indicative of a logical zero;

upon determining that the terminal is set to the low level, actuate a second electrical switch to connect a pull-up resistor to the terminal;

initiate a timer upon actuating the second electrical switch;

monitor the terminal to determine that a second voltage at the terminal indicates that the terminal is set to a high level indicative of a logical one;

upon determining that the terminal is set to the high level, obtain a value from the timer; and access a lookup table stored in the memory to determine the capacitance based on the obtained timer value.

3. The device of claim 1, wherein to determine the humidity level, the memory further comprises instructions that cause the at least one processor to perform operations to:

access a lookup table stored in the memory to obtain the humidity level based on the calculated capacitance and the obtained temperature measurement.

4. The device of claim 3, wherein the lookup table is device-specific with entries dependent on mechanical characteristics of the device.

5. The device of claim 1, wherein the notification to the wearer is delivered via a mobile application on a smartphone in communication with the ear-wearable device.

6. The device of claim 5, wherein the notification to the wearer includes a message with instructions for reducing humidity in the ear-wearable device.

7. The device of claim 1, wherein the notification to the wearer is delivered via the ear-wearable device.

8. The device of claim 7, wherein the notification to the wearer includes an audible notification.

9. The device of claim 1, wherein the memory includes firmware for the device.

10. The device of claim 1, wherein the ear-wearable device is a hearing aid.

11. A method, comprising:

calculating a capacitance between a terminal of a processor within a housing of an ear-wearable device and a designated ground plane within the housing;

obtaining a temperature measurement from a sensor within the housing;

determining a humidity level within the housing using the calculated capacitance and the obtained temperature measurement;

comparing the determined humidity level to one or more predetermined humidity trigger levels; and sending a notification to a wearer of the ear-wearable device conditioned on the comparison.

12. The method of claim 11, wherein calculating the capacitance includes:

setting the terminal to an input mode;

actuating a first electrical switch to connect a pull-down resistor to the terminal;

monitoring the terminal to determine that a first voltage at the terminal indicates that the terminal is set to a low level indicative of a logical zero;

upon determining that the terminal is set to the low level, actuating a second electrical switch to connect a pull-up resistor to the terminal;

initiating a timer upon actuating the second electrical switch;

monitoring the terminal to determine that a second voltage at the terminal indicates that the terminal is set to a high level indicative of a logical one;

upon determining that the terminal is set to the high level, obtaining a value from the timer; and accessing a lookup table to determine the capacitance based on the obtained timer value.

13. The method of claim 11, wherein determining the humidity level includes:

accessing a lookup table to obtain the humidity level based on the calculated capacitance and the obtained temperature measurement.

14. The method of claim 11, wherein calculating the capacitance between the terminal of the processor and the designated ground plane includes calculating the capacitance between a general purpose input/output (GPIO) wire of the processor and the designated ground plane.

15. The method of claim 11, wherein calculating the capacitance between the terminal of the processor and the designated ground plane includes calculating the capacitance between the terminal of a system on chip (SoC) processor and the designated ground plane.

16. The method of claim 11, further comprising:

calculating the capacitance between multiple terminals of the processor and multiple designated ground planes to determine humidity levels at multiple locations within the housing.

17. The method of claim 11, wherein obtaining the temperature measurement from the sensor within the housing includes obtaining the temperature measurement from a temperature sensor of an inertial measurement unit (IMU) within the housing.

18. The method of claim 11, wherein sending the notification to the wearer of the ear-wearable device includes sending instructions to the wearer for reducing humidity within the ear-wearable device.

19. The method of claim 11, wherein sending the notification to the wearer of the ear-wearable device includes sending an audible notification to the wearer using the ear-wearable device.

20. The method of claim 11, wherein sending the notification to the wearer of the ear-wearable device includes sending the notification to the wearer of a hearing aid.

* * * * *